US007271384B2

(12) United States Patent
Sander

(10) Patent No.: US 7,271,384 B2
(45) Date of Patent: Sep. 18, 2007

(54) MASS SPECTROMETRIC SUBSTANCE IDENTIFICATION

(75) Inventor: Peter Sander, Bremen (DE)

(73) Assignee: Bruker Datonik, GmbH, Bremen (DE)

( * ) Notice: Subject to any disclaimer, the term of this patent is extended or adjusted under 35 U.S.C. 154(b) by 143 days.

(21) Appl. No.: 11/002,961

(22) Filed: Dec. 2, 2004

(65) Prior Publication Data

US 2005/0127288 A1 Jun. 16, 2005

(30) Foreign Application Priority Data

Dec. 10, 2003 (DE) ................................ 103 58 366

(51) Int. Cl.
*B01D 59/44* (2006.01)

(52) U.S. Cl. ........................ 250/282; 250/283; 250/284

(58) Field of Classification Search ................ 250/282, 250/283, 284
See application file for complete search history.

(56) References Cited

U.S. PATENT DOCUMENTS 4,713,346 A 12/1987 Gallop et al.
6,492,639 B1 12/2002 Horner et al.
6,770,871 B1 8/2004 Wang et al.
2002/0086434 A1 7/2002 Roussis et al.
2002/0168775 A1 11/2002 Gao
2003/0213902 A1 11/2003 Takahashi
2004/0041089 A1 3/2004 Weimin et al.

OTHER PUBLICATIONS

UK, Search Report, Apr. 8, 2005.

*Primary Examiner*—Sara Crane
(74) *Attorney, Agent, or Firm*—The Law Offices of Paul E. Kudirka

(57) ABSTRACT

The invention relates to the identification of substance ions, which are usually generated by electro spray ionization after separation by liquid chromatography or capillary electrophoresis, with the help of libraries with mass spectra. The substance ions are frequently formed not only in a protonated (or deprotonated) form but also as adducts with cations or anions, a fact which complicates identification. The invention involves making identification more accurate by additionally carrying out a determination of the most probable molar mass with the help of adduct patterns.

12 Claims, 2 Drawing Sheets

MASS SPECTROMETRIC SUBSTANCE IDENTIFICATION

FIELD OF THE INVENTION

The invention relates to the identification of substance ions, which are usually generated by electro spray ionization after separation by liquid chromatography or capillary electrophoresis, with the help of libraries with mass spectra. The substance ions are frequently formed not only in a protonated (or deprotonated) form but also as adducts with cations or anions, a fact which complicates identification.

BACKGROUND OF THE INVENTION

The analysis of both environmentally relevant substances and natural products has, to a large extent, moved on from mass spectrometry/gas chromatography (GC-MS) to the coupling of mass spectrometry with liquid chromatography (LC-MS) or capillary electrophoresis (CE-MS). The reasons for this are manifold: on the one hand, most of the substances in this field currently under investigation can no longer be vaporized without decomposition, an indispensable requirement for gas chromatography; on the other, these substances are usually already in an aqueous state at the locations where they occur. In this description, the vaporization capability forms the border between the "light molecules" and the "medium weight molecules".

"Environmentally relevant substances" should be understood here as such substances and their decomposition products (metabolites) which we encounter in our environment—nature, plants, animals—in mainly aqueous solutions where they are subject to continuous chemical, enzymatic or microbiological decomposition. This could be the metabolism of potential pharmaceuticals or the decomposition of herbicides or pesticides in humans, animals, plants, nature, or even as residues in food. The original substances are usually man-made and could possibly be known at the beginning of the analysis, though this is not necessary.

"Natural products" are defined here as the large group of organic substances which occur in the untouched nature, especially in animals and plants but also in fossil deposits, and which do not belong to the group of chain biopolymers (proteins, DNA, polysaccharides) termed "high-molecular". These natural products include many hormones, vitamins, and active substances in plants as well as the infinitely large number of ingredients in crude oils and coals. In addition to purely organic substances, metal-organic and mineral-organic substances also occasionally occur here.

Environmentally relevant and natural products, and the whole substance group of the medium weight range, are of great general interest. As briefly described above, a small proportion of them can be identified using GC-MS. This identification is relatively easy because the usually used electron impact ionization provides mass spectra which can be easily identified by library searches. The nowadays preferred method LC-MS, however, has a much more general application. It is separation by liquid chromatography (HPLC=high performance liquid chromatography) with subsequent ionization using electro spray ionization (ESI). This method offers advantages but also a series of difficulties, beginning with the fact that the spectra contain hardly any characteristic fragment ions. In order to overcome these difficulties, the spectra of positive and negative ions are acquired in quick succession and, in both cases, the daughter ion spectra of the prominent ions in each case are also automatically acquired; but, even then, rapid identification is problematic. This is because they belong to a large number of different chemical classes, behaving differently in fragmentation, and also because of the frequent formation of simple or complex adduct ions. The term "prominent ions" is taken here to mean ions whose intensity makes them stand out; depending on the affinity to adducts, these could be the pseudo-molecular (protonated) ions or they could also be some adduct ions. Up to now, there is no rapid recognition method for adduct ions.

Besides the separation of substances by liquid chromatography, separation using different types of capillary electrophoresis is also coming to the fore. The term "pseudo-molecular ions" is defined here as the protonated molecular ions (hydrogen ion adducts) in the mass spectra of the positive ions, and the deprotonated molecular ions (hydrogen ion deducts) in the mass spectra of the negative ions. Depending on the voltage polarity applied, the process of electro spray ionization creates either positive or negative ions which can be acquired as positive and negative ion mass spectra by appropriate mass spectrometers. The negative deprotonated ions probably arise as a result of the attachment of an $OH^-$ ion to the substance molecule, with the immediate splitting off of $H_2O$.

The analyte substances under consideration here generally have molecular weights between around 100 and 1000 atomic mass units and are usually found in complex solutions which also contain varying degrees of salts and hence both cations and anions, mainly various alkali ions and chlorine ions which form adduct ions from substance molecules with these cations and anions. Electro spray ionization generates mainly singly charged ions but there are exceptions here, as well, (particularly in the case of heavier analyte substances) where doubly charged ions occur in part as adduct ions. The separation of mixtures using liquid chromatography and the subsequent electro spray ionization thus frequently generates alkali-adduct ions (cation adducts) of the form $(M+Kat)^+$ in the positive mass spectrum instead of the $(M+H)^+$ pseudo-molecular ions usually formed; in the case of negative ions, anion adducts of the form $(M+An)^-$ are frequently formed instead of the pseudo-molecular ions $(M-H)^-$.

The affinity of the substances to the alkali ions varies drastically. There are substances which appear almost exclusively in the form $(M+Na)^+$ in this type of analysis, i.e. only as adducts with sodium. The signal of the protonated pseudo-molecular ions $(M+H)^+$ can thus be very small or even disappear completely in the background noise. It is therefore difficult to identify these substances, particularly since, as yet, the state of the art to acquire daughter ion spectra just by the search for prominent ions does not always include the acquisition of the daughter ion spectra of the pseudo-molecular ions. It is, however, possible that various adduct ions appear side by side, for example $(M+Na)^+$ and $(M+K)^+$.

An instrument to analyze environmentally relevant substances and natural products consists of the coupling of a liquid chromatograph via a device for electro spray ionization to a mass spectrometer which can measure both positive and negative ions and which possesses a device to fragment the ions in order to acquire the daughter ion spectra. A high-frequency ion trap mass spectrometer according to Wolfgang Paul is mentioned as one example of such a mass spectrometer. A second example is the Fourier transform mass spectrometer. Other types are tandem mass spectrometers consisting of quadruple filters and collision cells in connection with a second mass spectrometer, for example, a time-of-flight mass spectrometer with orthogonal ion injection.

A favorable method for identifying substances with such an instrument therefore consists of not only acquiring both positive and negative mass spectra for each eluting substance in rapid succession, but also the daughter ion spectra for both polarities. The type of parent ion chosen for acquiring the daughter ion spectra generally depends on the intensity of the ions in the mass spectrum, usually supported by a list of prohibited ions which forbids the use of the ions of impurities which are always present. In such cases, it is frequently only the daughter ion spectrum of an adduct ion which is acquired, since the pseudo-molecular ions are often only of low intensity. The daughter ion spectrum of the adduct ions, however, generally contain very little information, since they often indicate only the loss of the adduct and contain no further information concerning the structure of the substance. Mass spectra and daughter ion spectra are then used to identify the substance by a spectrum library, said spectrum library contains positive and negative substance spectra as well as daughter ion spectra of the pseudo-molecular ions and, where possible, daughter ion spectra of the most common adduct ions.

However, since the spectra generated by electro spray ionization do not, as a rule, contain any fragment ions, and since the daughter ion spectra of these substance groups also frequently contain relatively little information compared to electron impact spectra because they have only few fragment ions, the results of the identification thus obtained are ambiguous in the majority of analyses. As explained above, the daughter ion spectra of adduct ions, in particular, are frequently virtually useless for an identification.

Even though the mass spectra of the substances contain practically no fragment ions, they can be very complex. The process of electro spray ionization generates primarily singly charged ions but also doubly charged ones. In addition, ions of the substance dimers, in some cases even substance trimers, are formed. All these ions are subject to adduct formation: adducts of the singly charged molecular ions, the doubly charged molecular ions and the dimer ions. These adducts can, in turn, be single anion or cation adducts or also more complex adducts with several anions or cations. The type of adduct depends on those substances which are capable of dissociation, usually salts, which remain in the solution after sample preparation, and also on the affinity of the substances to the various anions and cations. It is generally difficult to remove the salts, in many cases it is nearly impossible. The substances capable of dissociation can, in turn, influence the formation of dimers and trimers. The requirements made of the solvent cleanliness frequently extend beyond the degree of purity of the solvents commercially available as standard.

Since the composition of the solution containing the substances is never completely the same, alone by virtue of the origin of the substances, it follows that the spectra, with their complex formation of adducts, dimer-adducts and doubly charged adducts are never similar enough to permit an unequivocal identification of the substance.

SUMMARY OF THE INVENTION

The basic idea of the invention is to complement an identity search using spectral comparisons in a substance library via a determination of the most probable molecular weight (molar mass) of the substance, said determination being based on an expectable adduct pattern. An expectable adduct pattern is represented by mass differences of expectable adducts to the molar mass in the positive or negative mass spectrum. The mass differences in the positive spectrum are based on protonated (adduct with hydrogen ion) and on the cation adducts expectable as a result of sample preparation; the mass differences in the negative spectrum result from deprotonation (deduct of a hydrogen ion) and the expectable anion adducts. In the absence of cation and anion adducts, a mass difference of 2 atomic mass units between the negative and positive pseudo-molecular ions is a strong indication of the molar mass.

The invention is based on the fact that, firstly, the loss of fragments in electro spray ionization mass spectra is rare and, secondly, it is usually possible to clearly differentiate between adduct ion formation and the loss of fragments. If, in a substance, the sodium adduct $(M+Na)^+$ occurs in addition to the pseudo-molecular ion $(M+H)^+$, for example, then the mass difference of 22 atomic mass units is a strong indication of the presence of exactly this adduct ion. It is impossible for a molecular fragment with 22 mass units to split off from a molecular ion since neither $CH_{10}$ nor $NH_8$ nor $OH_6$ nor $FH_3$ exist; if the ions in question are not adduct ions with Na, then they can only be two different substances not separated by chromatography which coincidentally have this mass difference. The probability of this is very small. If, in addition, the potassium adduct $(M+K)^+$ occurs, then something similar applies to the mass difference of 16 atomic mass units between $(M+Na)^+$ and $(M+K)^+$. The simultaneous occurrence of sodium and potassium adducts can therefore already lead to adduct recognition without the pseudo-molecular ion being recognizably present. In the case of negative adduct ions with anionic chlorine $(M+Cl)^-$, also, it is practically impossible for the differences of 36 and 38 mass units to the pseudo-molecular ion $(M-H)^-$ to be caused by fragment loss.

Through the careful addition of salt during sample preparation, for example by adding potassium fluoride, it is possible to control adduct formation to some extent in order to obtain a more unequivocal determination of the molar mass.

The search for the most probable molar mass can be carried out using a correlation analysis between mass spectra and the expectable adduct pattern. A common correlation analysis of a combined adduct pattern consisting of positive and negative intensities in a combined positive and negative mass spectrum, which also consists of positive and negative intensities, is particularly favorable. The choice of intensities of the adduct pattern depends on experiential values, in the simplest case it is possible to assume the intensity values +1 and −1.

Knowing the probable molar mass and the preferred adducts, it is possible to also identify dimer adducts and adducts of doubly charged substance ions and to use them to confirm identity. Dimer adducts are strongly concentration dependent; they often only become possible by cationic attachment, as shown in FIG. 1.

In general, the daughter ion spectra of pseudo-molecular ions provide more information concerning the identity of the substance than the daughter ion spectra of adduct ions. A further idea of the invention is therefore to use the adduct pattern in a spectrum to locate the pseudo-molecular ion in order to subsequently acquire (with feedback control) a daughter ion spectrum of this ion, even if this pseudo-molecular ion is only very small or even not visible at all in the background noise.

BRIEF DESCRIPTION OF THE DRAWINGS

The above and further advantages of the invention may be better understood by referring to the following description in conjunction with the accompanying drawings in which.

DETAILED DESCRIPTION

The invention involves carrying out a determination of the probable molar mass by recognition of the adduct ion pattern in addition to the search in spectral libraries for the mass spectrometric identification of medium-weight analyte substances ionized by electro spray ionization in order to be sure of the identification. The substances are usually pre-separated by liquid chromatography and are therefore only available for mass spectrometric measurement for a few seconds. All mass spectra and daughter ion spectra must be acquired in these few seconds.

Figure 1A:
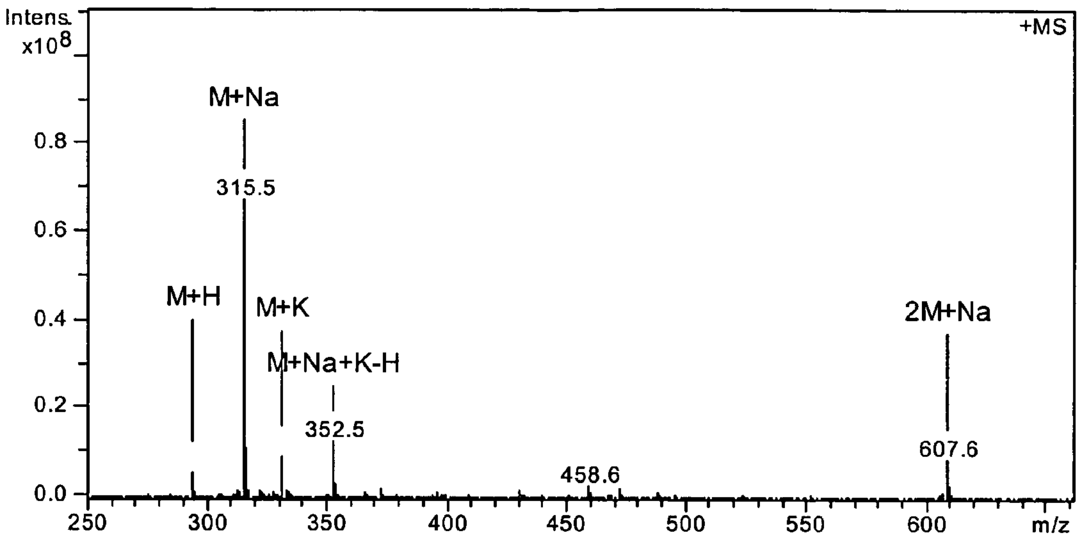
FIG. 1A shows a positive mass spectrum of a substance ionized by electro spray ionization.
Figure 1B:
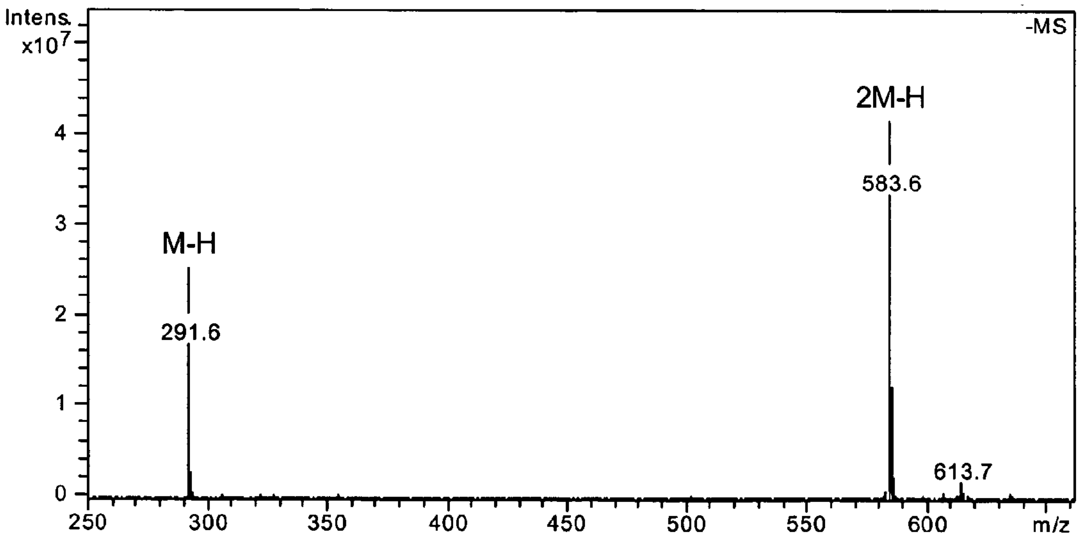
FIG. 1B shows a negative mass spectrum of a substance ionized by electro spray ionization.

FIG. 1A shows a positive mass spectrum of a substance ionized by electro spray ionization. Similarly, FIG. 1B shows a negative mass spectrum from the same type of ionization. In the positive spectrum, which is very simple to interpret, in addition to the pseudo-molecular ion, adducts with sodium, with potassium and even with both sodium and potassium occur, in the latter case a deprotonation being necessary in order to retain only one positive charge. The dimer occurs only as a sodium adduct. The negative spectrum interestingly exhibits no adduct formation with chlorine; even the dimer formation occurs without the assistance of the sodium ion.

Most of the mass spectrometers available today can be switched from the acquisition of positive ion spectra to the acquisition of negative ion spectra. The switchover is not instantaneous, however, and requires shorter or longer switching and rest times depending on the type of mass spectrometer. The usual procedure, therefore, is to first acquire a positive mass spectrum and then daughter ion spectra of positive ions, keeping the number of daughter ion spectra as low as possible. It is also important to find the parent ion which can provide the most information for the daughter ion spectra. The parent ion providing the most information is usually the pseudo-molecular ion, even when it has only a low intensity in the spectrum. With some types of mass spectrometer, e.g. ion trap mass spectrometers, the pseudo-molecular ion can still be used as a parent ion (by appropriate sampling of the ions) even if it practically disappears in the background noise.

Only when all positive spectra have been acquired does the mass spectrometer switch to the acquisition of negative spectra and this only if enough time remains. There is usually little time left for the acquisition of the daughter ion spectra of negative ions and this must be used to maximum advantage. It is also a good idea to find the pseudo-molecular ion as parent ion in this case, even if it is only of low intensity.

If only (or initially only) mass spectra of positive ions are scanned, then a simple embodiment of the invention consists in searching for singly charged ion signals with a mass difference of 22 atomic mass units in the mass spectrum of the substance, since adducts with sodium are the most frequent by far. The singly charged ion signals can be recognized by the fact that the separations of their isotope ions correspond to integral mass units. The difference of 22 mass units corresponds to the mass difference between the pseudo-molecular ion $(M+H)^+$ and the sodium adduct ion $(M+Na)^+$. This difference cannot occur in practice as the loss of a neutral fragment and is therefore an initial strong indication of the most probable molar mass.

If this difference of 22 mass units occurs twice, it is to be presumed that it represents the differences between the sodium adducts of the molecular ion $(M+Na)^+$ and the dimer ion $(2M+Na)^+$ and the corresponding hydrogen ion adducts $(M+H)^+$ and $(2M+H)^+$. This presumption can be confirmed by very easy and fast calculations and it leads to an already accurate determination of the molar mass of the substance. This simple method is surprisingly often very successful.

It is, however, frequently the case that the substance only combines to form a dimer when sodium is adducted. This then means that the sodium ion adduct $(2M+Na)^+$ but not the hydrogen ion adduct $(2M+H)^+$ exists. Here, also, a check by calculation can confirm the probable molar mass. Such a check is always advisable if further ion groups appear way above the ions with the mass difference of 22 mass units.

If a mass difference of 22 mass units is completely absent from the positive spectrum, then one can search for a mass difference of 16 mass units. It is then highly probable that this is the difference between the sodium adduct $(M+Na)^+$ and the potassium adduct $(M+K)^+$. The occurrence of dimer adducts provides confirmation in this case as well.

More complex adduct ions also exist, however: the adduct ions $(M+CH_3OH+Na)^+$ and $(M+NH_4+K-H)^+$ have also been observed, for example.

Further confirmation can also be obtained from the doubly charged ions which occasionally occur. The probability of doubly charged ions increases with the increasing molar mass of the substance. These can be of the type $(M+2H)^{++}$, $(M+H+Na)^{++}$ or $(M+2Na)^{++}$; adducts with other cations are also possible, of course.

These determinations of the most probable molar mass can be carried out extraordinarily quickly (a few milliseconds) in modern computers as used to control mass spectrometers. The calculations can therefore also be used to select those parent ions suitable for the scanning of daughter ion spectra in real time. In the majority of cases, the daughter ion spectrum of the pseudo-molecular ion provides the best information about the identity of the substance.

If substance from the chromatographic peak is still available at this point, the acquisition can be switched over to a negative substance mass spectrum.

An initial, already relatively accurate indication of the most probable molar mass is obtained if, in the negative spectrum, one finds an ion signal which lies two masses below the positive pseudo-molecular ion, where the positive pseudo-molecular ion can be either a measured ion mass or only a calculated one. In the rare cases in which the negative pseudo-molecular ion disappears, one can examine whether known mass differences occur between adduct ion signals in the positive and in the negative mass spectrum. In particular, two differences of 12 and 14 mass units to two heavier ions in the negative mass spectrum indicate the difference between the sodium adduct $(M+Na)^+$ and the chlorine adduct $(M+Cl)^-$. The intensity ratio of 1:3 of the two ions in the negative spectrum can also indicate chlorine in this case. Such a constellation alone is quite an accurate indication of the probable molar mass.

Figure 2:
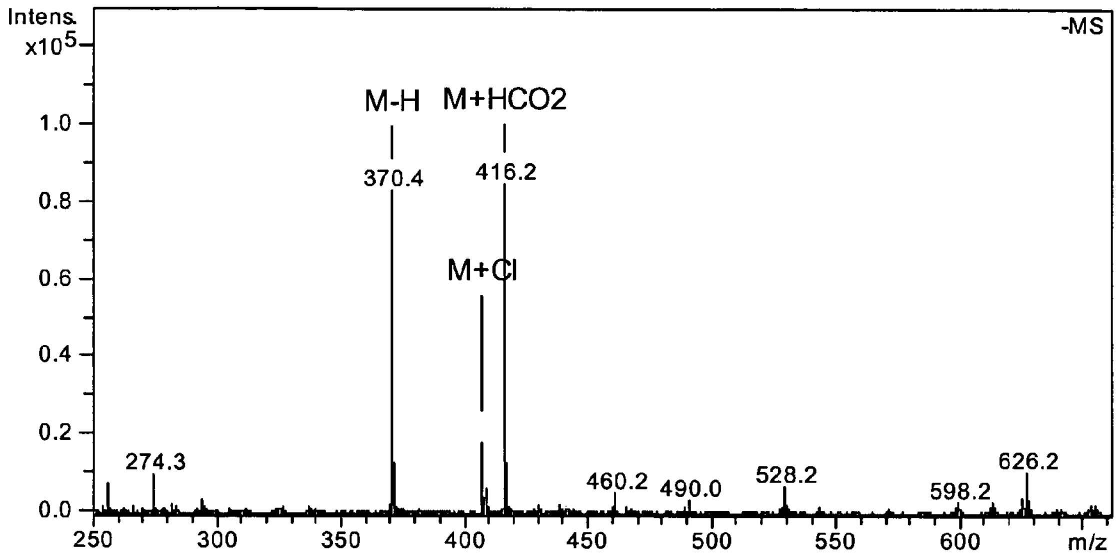
FIG. 2 shows the negative spectrum of another substance with adducts of chlorine and with an $HCO_2$ group which has also been frequently observed in other spectra.

The negative adduct ions also exist in more complex forms, for example $(M+HCO_2)^-$ or $(M+CH_3HCO_2)^-$ have been observed. FIG. 2 shows the negative spectrum of a substance with adducts of chlorine and with an $HCO_2$ group. In the case of negative dimers, forms of the composition $(2M+Na+2H)^-$ have also been seen before, i.e. two negative pseudo-molecular ions held together by a positive sodium ion.

It is hence the basic idea of the invention to complement the identity search using spectral comparisons with a substance library by a determination of the most probable molecular weight (molar mass) of the substance, this determination being based on an expectable adduct pattern. An expectable adduct pattern comprises mass differences of expectable adducts to the molar mass in the positive or negative mass spectrum. The mass differences in the positive spectrum are based on protonation (adduct with hydrogen ion) and on the cation adducts expectable from sample preparation, the mass differences in the negative spectrum result from deprotonation (deduct of a hydrogen ion) and the expectable anion adducts. In the absence of cation and anion adducts, the mass difference of 2 atomic mass units between the negative and positive pseudo-molecular ions is already a strong indication of the molar mass.

The invention is based, in particular, on the fact that there is a clear distinction between the formation of adduct ions with the most important adduct ions and the formation of fragment ions, since it is practically impossible for the mass differences which occur with adduct formation to occur as a result of an ion decomposition. In mass spectra produced by electro spray ionization, there are scarcely any fragment ions anyway. The mass differences which occur during adduct formation can therefore only arise by chance as a result of an overlapping of different substances which are not separated by chromatography.

Adduct formation can also be willfully controlled. Since it is often not possible to remove all salts and other materials which are capable of dissociation from the analyte solution, it is at least possible to prevent the formation of only one type of adduct. If only one single type of adduct occurs, the identification of the analyte substance is made more complicated since, in this case, neither the correct parent ions for a scan of the daughter ion spectra which contain the information are available, nor is it easy to determine a probable molar mass. Targeted addition of salts during sample preparation, for example adding potassium fluoride to the sodium chloride which is practically always present in the sample solution, enables the adduct formation to be controlled to some degree. This method ensures the formation of at least two different types of adduct which thus allows more certain determination of the molar mass.

Whereas the above describes the search for the most probable molar mass as a series of individual tests, it can also be carried out in a more closed form using a correlation analysis between mass spectra and the expectable adduct pattern. A common correlation analysis of a combined adduct pattern made of positive and negative intensities in a combined positive and negative mass spectrum which also consists of positive and negative intensities, is particularly favorable. The molar masses generally stand out from the correlation spectrum as the largest signals. Both the choice of adduct pattern and the choice of the intensities for the adduct pattern depend on experiential values. In the simplest case, the intensity values can be taken as +1 and −1.

The chromatographic retention times can also be used to determine the identity of the substances, as is occasionally the case. For this to be possible, these retention times must also be stored in the spectral libraries. Modern liquid chromatographs are equipped with detectors for measuring UV absorption spectra. These UV absorption spectra can also be stored in the libraries and used to determine identities.

Capillary electrophoresis instruments can also be used instead of liquid chromatographs to separate the substances.

The invention claimed is:

1. Method for the identification of substances comprising the following steps:

(a) ionization of a substance by electro spray ionization, (b) acquisition of at least one mass spectrum of a given polarity, (c) determination of a probable molar mass of the substance by adduct pattern recognition, (d) acquisition of at least one daughter ion spectrum, and (e) identity search by means of spectral comparisons in a library containing mass spectra and daughter ion spectra of known substances, and comparing the determined probable molar mass with the molar masses of the known substances of the library as a supplementary identity criterion.

2. Method according to claim 1 wherein mass spectra and daughter ion spectra of positive and negative ions are acquired.

3. Method according to claim 1 wherein the library contains daughter ion spectra of positive and negative pseudo-molecular ions and daughter ion spectra of adduct ions.

4. Method according to claim 1 wherein the search for the adduct pattern is undertaken using a correlation of the mass spectrum with the adduct pattern.

5. Method according to claim 1 wherein the ionization of the substance is preceded by substance separation by means of liquid chromatography or capillary electrophoresis.

6. Method according to claim 5 wherein the chromatographic retention time or electrophoretic migration time is used as a supplementary search criterion, the spectral libraries also containing retention times or migration times.

7. Method according to claim 1 wherein additional spectral comparisons with UV absorption spectra are employed for identity determination.

8. Method according to claim 1 wherein the adduct pattern is influenced by the addition of salts or other substances capable of dissociation during sample preparation.

9. Method according to claim 1 wherein the selection of the type of parent ion for the acquisition of daughter ion spectra is based on the intensity of the ions in the mass spectrum.

10. Method according to claim 1 wherein the parent ions for the acquisition of daughter ions are selected under consideration of the adduct pattern in the mass spectrum.

11. Method according to claim 10 wherein the pseudo-molecular ion is selected for the acquisition of the daughter ion spectrum.

12. Method according to claim 1 wherein after determining the most probable molar mass, the adduct ions with substance dimers and doubly charged adduct ions are employed to confirm the molar mass and substance identity.

* * * * *